United States Patent
Whatcott

(10) Patent No.: US 11,174,110 B2
(45) Date of Patent: Nov. 16, 2021

(54) AIR TABLES FOR MAKING MATTRESS TOPPERS AND RELATED METHOD

(71) Applicant: Purple Innovation, LLC, Alpine, UT (US)

(72) Inventor: Russell B. Whatcott, Eagle Mountain, UT (US)

(73) Assignee: Purple Innovation, LLC, Lehi, UT (US)

(*) Notice: Subject to any disclaimer, the term of this patent is extended or adjusted under 35 U.S.C. 154(b) by 0 days.

(21) Appl. No.: 15/880,163

(22) Filed: Jan. 25, 2018

(65) Prior Publication Data
US 2018/0148275 A1    May 31, 2018

Related U.S. Application Data

(62) Division of application No. 15/063,192, filed on Mar. 7, 2016, now Pat. No. 10,807,811.

(51) Int. Cl.
*B65G 51/02* (2006.01)
*B65G 51/03* (2006.01)
*A47C 31/10* (2006.01)

(52) U.S. Cl.
CPC ............ *B65G 51/03* (2013.01); *A47C 31/105* (2013.01); *B65G 2207/06* (2013.01)

(58) Field of Classification Search
CPC .... B65G 51/02; B65G 51/03; B65G 2207/06; B23Q 1/38; B23Q 1/385; F16C 32/0614
(Continued)

(56) References Cited

U.S. PATENT DOCUMENTS

| 4,275,983 A * | 6/1981 | Bergman | B23Q 16/001 198/345.3 |
| 4,326,831 A * | 4/1982 | Bergman | B23Q 1/28 269/20 |

(Continued)

FOREIGN PATENT DOCUMENTS

| CN | 2170047 Y | 6/1994 |
| CN | 102028365 A | 4/2011 |

(Continued)

OTHER PUBLICATIONS

International Search Report for PCT Application No. PCT/US2017/020789 dated May 29, 2017, 3 pages.
(Continued)

*Primary Examiner* — Joseph A Dillon, Jr.
(74) *Attorney, Agent, or Firm* — Dentons Durham Jones Pinegar

(57) ABSTRACT

A mattress topper for fitting to a mattress may include a lower layer, a side layer configured to extend down along a side of the mattress, and an upper layer overlaying the lower layer and at least partially disposed between the lower layer and the side layer. The mattress topper may also include a seam including threads and extending along peripheral edges of the lower layer and the upper layer and extending through the lower layer, upper layer, and side layer, the lower layer and side layer bearing the threads of the seam. An air table may include a top panel including a plurality of vents extending through the top panel. A method of making a mattress topper with an air table may include lifting the mattress topper with the air table while performing sewing procedures on the mattress topper.

8 Claims, 9 Drawing Sheets

(58) Field of Classification Search
USPC .......... 406/87, 88; 414/676; 384/12; 269/20; 248/631

See application file for complete search history.

(56) References Cited

U.S. PATENT DOCUMENTS

| | | | | |
|---|---|---|---|---|
| 4,354,796 | A * | 10/1982 | Bergman | B23Q 1/28 198/721 |
| 4,444,541 | A * | 4/1984 | Bergman | B23Q 1/38 198/375 |
| 4,527,346 | A * | 7/1985 | Schwartzott | A41H 43/005 112/DIG. 2 |
| 4,648,779 | A * | 3/1987 | Weitzman | B65G 51/03 406/88 |
| 4,759,677 | A * | 7/1988 | Lukens, Jr. | A41H 43/0292 414/353 |
| 4,822,214 | A * | 4/1989 | Aidlin | B65G 51/035 406/86 |
| 4,962,546 | A | 10/1990 | Vitale | |
| 5,102,288 | A * | 4/1992 | Kawasaka | A41H 15/00 269/54.5 |
| 5,122,016 | A * | 6/1992 | Lenhart | B65G 51/03 406/86 |
| 5,451,125 | A * | 9/1995 | Lenhart | B65G 51/03 406/88 |
| 5,560,308 | A | 10/1996 | Eto | |
| 5,636,395 | A | 6/1997 | Serda | |
| 5,749,111 | A | 5/1998 | Pearce | |
| 5,994,450 | A | 11/1999 | Pearce | |
| 5,996,148 | A | 12/1999 | McCain et al. | |
| 6,026,527 | A | 2/2000 | Pearce | |
| 6,428,246 | B1 * | 8/2002 | Landrum | B65G 51/02 226/118.5 |
| 7,435,039 | B2 * | 10/2008 | Ludwig | B65G 47/24 406/88 |
| 7,604,439 | B2 * | 10/2009 | Yassour | B24B 37/30 406/86 |
| 7,690,870 | B2 * | 4/2010 | Lisec | B65G 49/063 406/86 |
| 7,704,019 | B2 * | 4/2010 | Toda | B65G 47/24 406/12 |
| 8,113,761 | B2 * | 2/2012 | Ahn | B65G 51/03 414/676 |
| 8,932,692 | B2 | 1/2015 | Pearce | |
| 9,247,826 | B1 | 2/2016 | Holbrook et al. | |
| 2006/0165496 | A1 * | 7/2006 | Miyachi | B65G 51/02 406/88 |
| 2007/0283497 | A1 | 12/2007 | McCain | |
| 2011/0072591 | A1 | 3/2011 | Fang | |
| 2011/0268511 | A1 * | 11/2011 | Iida | B65G 49/065 406/88 |
| 2012/0284926 | A1 | 11/2012 | Tyree et al. | |
| 2013/0074273 | A1 | 3/2013 | Blazar | |
| 2013/0205506 | A1 | 8/2013 | Lachenbruch et al. | |
| 2014/0056654 | A1 * | 2/2014 | Zonenberg | B65G 51/03 406/88 |
| 2014/0215870 | A1 | 8/2014 | Horst | |
| 2015/0026893 | A1 | 1/2015 | Garrett et al. | |
| 2015/0284285 | A1 * | 10/2015 | Hoetzel | C03B 33/033 29/559 |
| 2015/0336751 | A1 * | 11/2015 | Tsunoda | B65G 49/065 406/88 |
| 2017/0224123 | A1 | 8/2017 | Holbrook et al. | |
| 2018/0066704 | A1 * | 3/2018 | Engel | G01B 5/0002 |
| 2019/0088507 | A1 * | 3/2019 | Suzuki | F16C 32/0618 |

FOREIGN PATENT DOCUMENTS

| | | |
|---|---|---|
| CN | 201948562 U | 8/2011 |
| CN | 203860908 U | 10/2014 |
| JP | H07-250985 A | 10/1995 |
| KR | 1020090018134 A | 2/2009 |

OTHER PUBLICATIONS

Written Opinion of the International Searching Authority for PCT Application No. PCT/US2017/020789 dated May 29, 2017, 6 pages.

European Patent Office, "Extended European Search Report," for application No. EPI7763802.0, dated Jul. 3, 2019.

Chinese National Intellectual Property Administration, "First Office Action," Chinese Application No. 201780015942.9, dated Jul. 16, 2020.

Taiwan Intellectual Property Office, Office Action, Taiwan application No. 106107014, dated May 13, 2020.

Taiwan Intellectual Property Office, Notice of Decision of Rejection, Taiwan Application No. 106107014, dated Sep. 16, 2020.

Chinese National Intellectual Property Administration, Notice of Allowance, Chinese Application No. 201780015942 9, dated Dec. 11, 2020.

European Patent Office, Communication pursuant to Article 94(3) EPC, European Application No. 17763802.0, dated Nov. 25, 2020.

* cited by examiner

AIR TABLES FOR MAKING MATTRESS TOPPERS AND RELATED METHOD

CROSS-REFERENCE TO RELATED APPLICATION

This application is a divisional of U.S. patent application Ser. No. 15/063,192, filed Mar. 7, 2016, the disclosure of which is hereby incorporated herein in its entirety by this reference.

TECHNICAL FIELD

This disclosure relates generally to mattress toppers and air tables for making mattress toppers. This disclosure further relates to methods of making mattress toppers with an air table.

BACKGROUND

Mattress toppers are often used to add cushion and/or support to mattresses. The mattress toppers often appear bulky and out of place. Furthermore, stress placed on the mattress topper during use (e.g., while sleeping on the mattress topper) can cause seams of the mattress topper to tear through the fabrics of the mattress topper, thus, shortening a lifetime of the mattress topper.

Making mattress toppers (e.g., performing sewing functions on a mattress topper) can be difficult because the mattress toppers are often heavy and difficult to maneuver while sewing. Sewing tables used to make mattress toppers often require multiple people to maneuver a mattress topper while sewing the mattress topper, and a weight of the mattress topper can often cause difficulty and/or mistakes while sewing the mattress topper.

BRIEF SUMMARY

Some embodiments of the present disclosure include a mattress topper for fitting to a mattress. The mattress topper may include a lower layer, a side layer configured to extend down along a side of the mattress, an upper layer overlaying the lower layer and at least partially disposed between the lower layer and the side layer, and a seam including threads extending along peripheral edges of the lower layer and the upper layer and extending through the lower layer, upper layer, and side layer. The lower layer and side layer of the mattress topper may bear the threads of the seam.

Some embodiments of the present disclosure include a mattress topper for fitting to a mattress. The mattress topper may include a lower layer, an upper layer overlaying the lower layer, and a side layer comprising a strip of material and extending along a peripheral edge of the lower layer and the upper layer and at least partially overlaying the upper layer. The side layer may be configured to extend down along a side of the mattress. The mattress topper may further include a seam including threads and connecting the lower layer, upper layer, and side layer together. The side layer and the lower layer may bear the threads of the seam.

Some embodiments of the present disclosure include an air table for making a mattress topper. The air table may include a top panel having a plurality of vents extending from a bottom surface of the top panel to a top surface of the top panel, a bottom panel disposed beneath the top panel, wherein a top surface of the bottom panel is at least substantially parallel to the top surface of the top panel, at least one sidewall extending along peripheral edges of the top panel and bottom panel and extending between the top panel and the bottom panel, and an air chamber defined between the top panel and the bottom panel and by the at least one sidewall. The air table may further include at least one air intake hole extending from a bottom surface of the bottom panel to the top surface of the bottom panel, and at least one air supply connected to the bottom panel and at least substantially aligned with the at least one air intake hole, the at least one air supply configured to blow air into an air chamber of the air table through the at least one air intake hole and to blow air out of the air chamber of the air table through the plurality of vents of the top panel.

Some embodiments of the present disclosure include a method of making a mattress topper with an air table. The method may include disposing the mattress topper on a top surface of the top panel of the air table, the top panel including a plurality of vents extending therethrough, causing air to blow through plurality of vents of the top panel of the air table, and causing the mattress topper to lift up relative to the top surface of the top panel of the air table.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
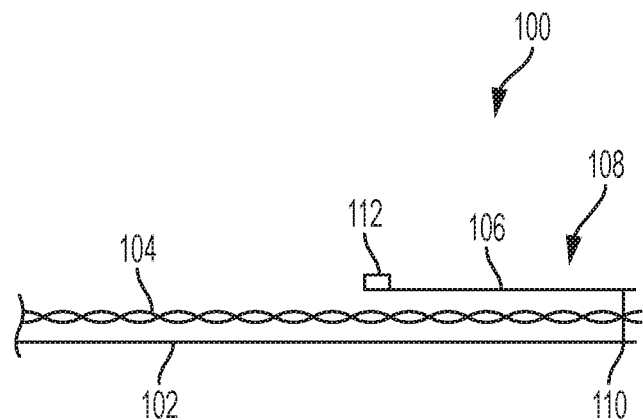
FIG. 1 is a simplified and schematically illustrated partial cross-sectional side view of a mattress topper according to an embodiment of the present disclosure.

The illustrations presented herein are not actual views of any mattress topper, air table, or any component thereof, but are merely idealized representations, which are employed to describe the present invention.

As used herein, any relational term, such as "first," "second," "adjacent," "top," "bottom," "lower," "upper," "middle," "beneath," "above," "below," etc., is used for clarity and convenience in understanding the disclosure and accompanying drawings, and does not connote or depend on any specific preference or order, except where the context clearly indicates otherwise. For example, these terms may refer to an orientation of elements of a mattress topper when disposed on a mattress in a conventional manner. Furthermore, these terms may refer to an orientation of elements of an air table when assembled on a ground surface.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Some embodiments of the present disclosure include a mattress topper for fitting to a mattress and adding cushion and/or support to the mattress. The mattress topper may include a lower layer, an upper layer, and a side layer. The lower and side layers may include woven fabrics and the upper layer may include a knitted fabric. The lower and upper layers may be at least generally a size of a top of a mattress upon which the mattress topper is to be fitted. Furthermore, the lower and upper layers may rest on the top of the mattress when the mattress topper is fitted to a mattress. The side layer may include at least one strip of material and may be shaped similar to a bed skirt or fitted sheet. In other words, the side layer may be sized and shaped to extend down along a side of the mattress from the lower layer and the upper layer. The lower layer, upper layer, and side layer may be connected together with a seam. The seam may be sewn along a peripheral edge of the lower and upper layers. The seam may include a plurality of threads, and the threads of the seam may be borne by the side layer and the lower layer. The side layer and the lower layer may serve to protect the upper layer of the mattress topper. The side layer may be sized and shaped to extend from the seam and then fold back on itself to extend down along the side of the mattress.

Some embodiments of the present disclosure include a mattress topper having a deformable support layer disposed between the lower layer and the upper layer. The deformable layer may include a gel material.

Some embodiments of the present disclosure include an air table for making a mattress topper. The air table may be configured to provide lift to the mattress topper while the mattress topper is being sewn. For example, the air table may be configured to lift up the mattress topper with air. The air table may include a top structure that includes a top panel having a plurality of vents extending therethrough. The air table may also include an air supply to blow air through the vents. Accordingly, the mattress topper may be placed above the plurality of vents of the top panel of the top structure of the air table, and air may be caused to blow through the plurality of vents to provide lift to the mattress topper. In other words, the mattress topper may be caused to "float" (e.g., hover) above a top surface of the top panel due to the air being blown through the plurality of vents.

FIG. 1 is a partial cross-sectional view of a mattress topper 100 according to an embodiment of the present disclosure. Some features of the mattress topper 100 of FIG. 1 may be exaggerated and/simplified to better show features of the mattress topper 100 and for clarity. The mattress topper 100 may be disposable on (e.g., fitted to) a mattress to add cushion (e.g., softness, comfort, pressure relief, etc.) and/or support (e.g., body support, spinal alignment, etc.) to the mattress. The mattress topper 100 may include a lower layer 102, an upper layer 104, and a side layer 106. The lower layer 102, the upper layer 104, and the side layer 106 may be connected together (e.g., sewn together) with a seam 108. The seam 108 may include a plurality of threads 110, and the seam 108 may extend along and proximate to a peripheral edge of the mattress topper 100. At the seam 108, the side layer 106 may be oriented adjacent to the upper layer 104, which in turn, is oriented adjacent to the lower layer 102. In other words, the upper layer 104 may be disposed between the side layer 106 and the lower layer 102 at the seam 108 of the mattress topper 100.

The lower layer 102 and the upper layer 104 of the mattress topper 100 may be generally the same size as a top of a mattress upon which the mattress topper 100 is to be fitted. For example, the lower layer 102 and the upper layer 104 may be generally the same size as a top of a twin, full, queen, king, or California king mattress depending on the size of the mattress. The side layer 106 may be sized and shaped similar to a bed skirt or fitted sheet. For example, the side layer 106 may include a strip of material sewn with the seam 108 to the outer peripheral edge of the upper and lower layers 104, 102. In other words, the side layer 106 may be sized and shaped to extend down from the upper layer 104 and the lower layer 102 along a side of the mattress and to at least substantially fully expose the upper layer 104. In some embodiments, the side layer 106 may be sized and shaped to extend along a full height of the mattress and to be at least partially tucked under the mattress. In some embodiments, the side layer 106 may include an elastic member 112 attached to the side layer 106 along an inner edge of the side layer 106 (e.g., an edge opposite the seam 108 and an edge that would be tucked under a mattress during use). The elastic member 112 may help keep the mattress topper 100 fitted to the mattress. Alternatively, other means may be employed for this same purpose, such as a partially sewn-in cord that can be tightened (cinched) and/or tied.

In some embodiments, the upper layer 104 may include a knitted fabric that is relatively more prone to unraveling and to tearing and less robust relative to the side layer 106 and the lower layer 102, which may include woven fabrics. Disposing the upper layer 104 (i.e., the more delicate fabric) between the side layer 106 and the lower layer 102 (i.e., the more robust fabrics) at the seam 108 and seaming the side layer 106, the upper layer 104, and the lower layer 102 together with the seam 108 in such an orientation may provide a more robust seam 108 and connection between the layers 102, 104, 106. In some embodiments, the lower layer 102 and the side layer 106 may bear the threads 110 of the seam 108. In other words, threads 110 of the seam 108 may bear against the fabrics of the lower layer 102 and the side layer 106, and the threads 110 of the seam 108 may simply pass through the fabric of the upper layer 104. Furthermore, due to the fabric of the side layer 106 and the lower layer 102 being woven, the side and lower layers 106, 102 may be less likely to let the seam 108 tear through the side layer 106 and the lower layer 102. Furthermore, having the side and lower layers 106, 102 bear the threads 110 of the seam 108 may reduce stress placed on the upper layer 104 by the seam 108 during use of (i.e., while sleeping on) the mattress topper 100. Accordingly, the side layer 106 and the lower layer 102 may serve to protect the more delicate upper layer 104, and a lifetime of the mattress topper 100 may be extended.

Furthermore, the seam 108 may be more robust (e.g., durable, strong, effective, etc.) than if the threads 110 of the seam 108 were to bear against the upper layer 104. Also, during sewing procedures, sewing the seam 108 in the orientation described above, avoids any need to close the seam 108 prior to trimming (e.g., cutting) the upper layer 104 (i.e., knitted layer).

As discussed above, the mattress topper 100 may be fitted to a mattress, and the side layer 106 of the mattress topper 100 may be folded back on the seam 108 and oriented to extend along the sides of a mattress. The side layer 106 may serve to secure the mattress topper 100 to the mattress and to at least partially hold the mattress topper 100 in place relative to the mattress.

Figure 2:
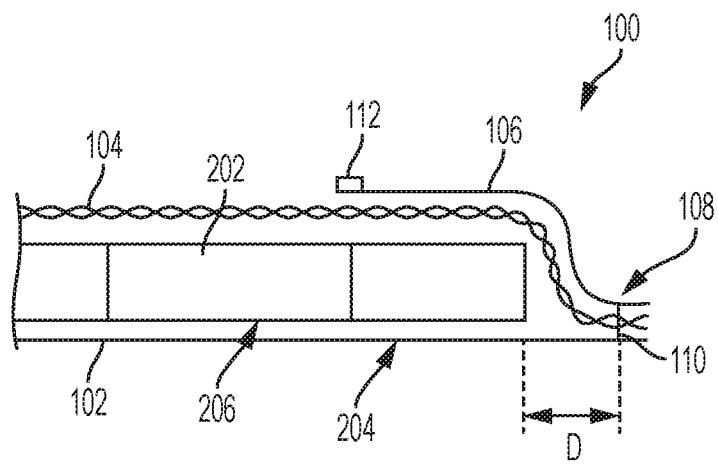
FIG. 2 is a simplified and schematically illustrated partial cross-sectional side view of a mattress topper according to another embodiment of the present disclosure.

FIG. 2 shows a partial cross-sectional view of a mattress topper 100 according to another embodiment of the present disclosure. Some features of the mattress topper 100 of FIG. 2 may be exaggerated and/or simplified to better show features of the mattress topper 100 and for clarity. The mattress topper 100 may be similar to the mattress topper 100 of the FIG. 1 and may include a deformable support layer 202 disposed between the upper layer 104 and the lower layer 102 of the mattress topper 100.

In some embodiments, the deformable support layer 202 material may include a hyper-elastic polymer. For example, the deformable support layer 202 may be formed entirely from a gel, or the deformable support layer 202 may have a composition comprising a gel and one or more additional non-gel materials. Such gels and gel compositions are described in, for example, U.S. Pat. No. 5,749,111 titled "Gelatinous Cushions with Buckling Columns" and issued on May 12, 1998, U.S. Pat. No. 6,026,527 titled "Gelatinous Cushions with Buckling Columns" issued Feb. 22, 2000, and U.S. Pat. No. 5,994,450 titled "Gelatinous Elastomer and Methods of Making and Using the Same and Articles Made Therefrom" issued on Nov. 30, 1999, each of which patents is incorporated in its entirety herein by this reference. In one embodiment, the gel may include an elastomeric gel comprising between about 15 to about 600 parts plasticizer per 100 parts solid elastomer by weight. For example, in one embodiment, the gel may comprise KRATON® E1830 elastomer and a white food grade mineral oil, such as CARNATION® oil. In another embodiment, the gel may comprise SEPTON® 4055 elastomer and a white food grade mineral oil. In additional embodiments, the gel may comprise a polyurethane-based gel, a silicone-based gel, and a PVC-based gel. The deformable support layer 202 may be a bare un-coated deformable support layer 202, or the deformable support layer 202 may be coated, covered with, adhered to, fused with, or integral with another material. For example, the deformable support layer 202 may include a cushion layer similar to the cushion described in U.S. Pat. No. 8,932,692, to Pearce, issued Jan. 13, 2015.

The deformable support layer 202 may have a thickness within the range of about 0.5 inch (1.27 cm) to about 3.0 inches (7.62 cm). In some embodiments, the deformable support layer 202 may have a thickness of about 2.0 inches (5.08 cm).

In some embodiments, the lower layer 102 of the mattress topper 100 may comprise a scrim fabric (e.g., a woven or non-woven fabric material) and portions of the deformable support layer 202 may seep through (e.g., be melt-fused into, bleed through, push through, leak through, pass through, etc.) the scrim fabric of the lower layer 102. For example, when the deformable support layer 202 includes a gel material, portions of the gel material may be heat fused through the lower layer 102 of the mattress topper 100. The portions of the deformable support layer 202 that extend through the scrim fabric of the lower layer 102 may create a non-slip surface or reduced slip surface on a lower surface 204 of the lower layer 102 (e.g., surface that would contact a mattress) of the mattress topper 100. The non-slip surface or reduced slip surface created by the deformable support layer 202 may help the mattress topper 100 stay in place relative to a mattress when fitted to a mattress.

Although the mattress topper 100 is described herein as including a deformable support layer 202, the disclosure is not so limited. Instead of or in addition to the deformable support layer 202, the mattress topper 100 may include one or more deformable layers of foam, felt, gel, air chambers, or other fibers (as a non-limiting example, polyester batting fill material).

When the mattress topper 100 includes the deformable support layer 202, the seam 108 of the mattress topper 100 may be separated from the deformable support layer 202 by a distance D along a plane defined by a bottom surface 206 of the deformable support layer 202 and in a direction perpendicular to a side of the deformable support layer 202 facing the seam 108. In some embodiments, distance D may be within a range of about 0.25 inch (0.635 cm) to about 5.0 inches (12.70 cm), a range of about 0.25 inch (0.635 cm) to about 3.0 inches (7.62 cm), or a range of about 0.25 inch (0.635 cm) to about 1.50 inches (3.81 cm). For example, distance D may be about 0.50 inch (1.27 cm). The deformable support layer 202 may have a general rectangle shape (e.g., the general shape of a mattress), and the seam 108 may be separated from each end (i.e., both longitudinal ends and lateral ends) of the deformable support layer 202 by distance D.

Figure 3:
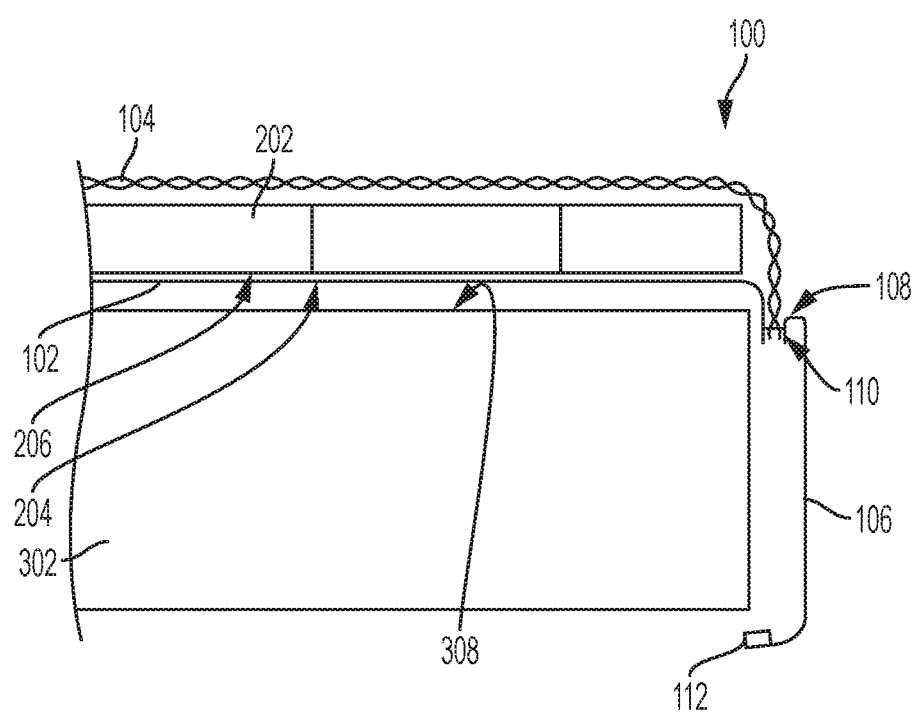
FIG. 3 is a simplified and schematically illustrated partial cross-sectional side view of the mattress topper of FIG. 2 fitted on a mattress.

FIG. 3 shows a partial cross-sectional view of the mattress topper 100 of FIG. 2 fitted on a mattress 302 and shows a drop down feature of the mattress topper 100. Some features of the mattress topper 100 and the mattress 302 of FIG. 3 may be exaggerated and/or simplified to better show features of the mattress topper 100 and the mattress 302 and for clarity. Referring to FIGS. 2 and 3 together, because the seam 108 of the mattress topper 100 is separated from the deformable support layer 202 by distance D, the seam 108 may drop below a bottom surface 206 of the deformable support layer 202 when the mattress topper 100 is fitted to the mattress 302. In other words, the fabric of the upper layer 104 and the fabric of the lower layer 102 may extend past a top 308 of the mattress 302 and may extend at least some distance down a side of the mattress 302. To facilitate description of the mattress topper 100 in the present disclosure, the upper and lower layers 104, 102 extending down at least some distance along a side of the mattress 302 will be referred to hereinafter as the "drop down feature."

The drop down feature of the mattress topper 100 may help prevent a seam of the mattress 302 and the seam 108 of the mattress topper 100 from being immediately adjacent to (e.g., stacked on top of) each other. By not stacking the seams, the mattress topper 100 may avoid a bulging appearance when fitted to a mattress 302. As a result, the drop down feature of the mattress topper 100 may provide the mattress topper 100 with a blended transition appearance when fitted to the mattress 302. Furthermore, the drop down feature may provide a more aesthetically pleasing appearance when fitted to a mattress 302. Moreover, by distancing the seam 108 of the mattress topper 100 from a seam of the mattress 302 (e.g., keeping the seam 108 of the mattress topper 100 from stacking onto the seam of the mattress 302), less stress may be placed on the seam 108 when fitting the mattress topper 100 to the mattress 302 and during use of (e.g., when sleeping on) the mattress topper 100. Reducing stress on the seam 108 of the mattress topper 100 may extend a life of the mattress topper 100.

Figure 4:
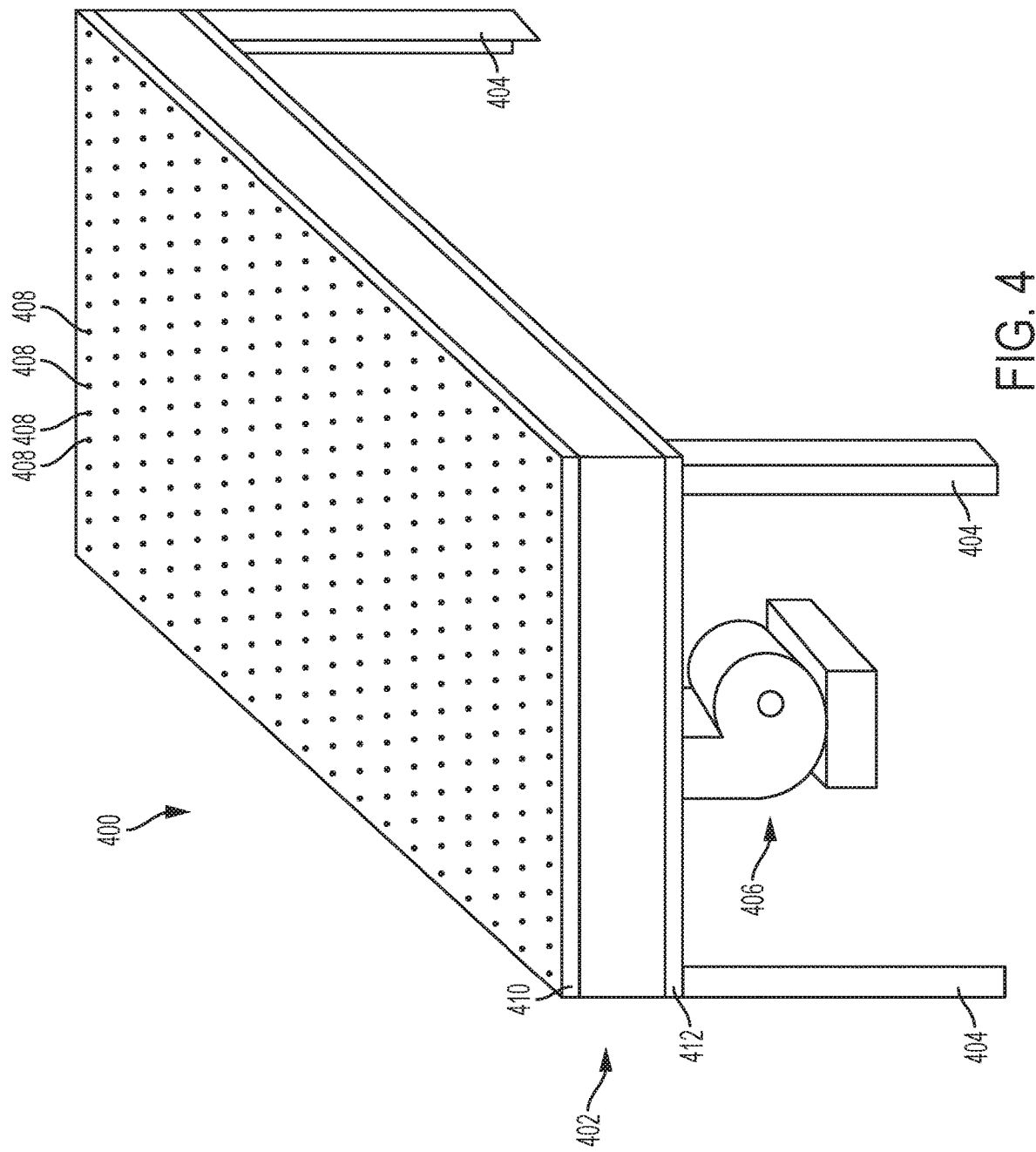
FIG. 4 is a simplified perspective view of an air table for making mattress toppers according to an embodiment of the present disclosure.

FIG. 4 is a perspective view of an air table 400 that may be used when making (e.g., sewing) the mattress toppers 100 of FIGS. 1-3 according to an embodiment of the present disclosure. Referring to FIGS. 3 and 4 together, for example, the air table 400 may be used to at least partially lift up a mattress topper 100 with air (i.e., provide lift to the mattress topper 100) to facilitate making the mattress topper 100. Mattress toppers 100 having the deformable support layer 202 can be relatively heavy, and because the deformable support layer 202 may extend through the lower layer 102 of the mattress topper 100, the mattress toppers 100 may be difficult to maneuver especially when such extension of material is meant t create a non-slip or non-skid effect. Thus, lifting the mattress toppers 100 with air (e.g., causing the mattress topper 100 to at least partially float or hover above the air table 400) can help facilitate fabrication of the mattress toppers 100 and, in particular, the sewing of the seam 108.

The air table 400 may include a top structure 402, a plurality of legs 404, at least one air supply 406, and a plurality of vents 408. The top structure 402 may include a top panel 410 and a bottom panel 412. The plurality of vents 408 may extend through the top panel 410 of the top structure 402. The plurality of legs 404 may extend from the bottom panel 412 of the top structure 402 and, when the air table 400 is in use and assembled, may rest on a ground surface. In some embodiments, the at least one air supply 406 may be disposed beneath the top structure 402 of the air table 400 and may be attachable to the bottom panel 412 of the top structure 402. In other embodiments, the at least one air supply 406 may be attachable to a sidewall or the top panel 410 of the air table 400. Regardless, the at least one air supply 406 may be oriented to blow air into the top structure 402 of the air table 400. In some embodiments, the at least one air supply 406 may include a centrifugal blower.

In some embodiments, the plurality of vents 408 may be formed (e.g., oriented) in the top panel 410 of the top structure 402 in a pattern. In other words, the plurality of vents 408 may be oriented in a pattern with respect to one another. For example, in some embodiments, the plurality of vents 408 may be oriented in a one-inch grid pattern. In other words, the plurality of vents 408 may be spaced apart from one another by about 1.0 inch (2.54 cm) along a length of the air table 400 and along a width of the air table 400. In other embodiments, the plurality of vents 408 may be oriented in a grid pattern and may be spaced apart from each other by about 1.0 inch (2.54 cm) to about 10 inches (25.4 cm). In other embodiments, the plurality of vents 408 may be oriented in circles, concentric rectangles, or any other pattern.

In some embodiments, the air table 400 may have a longitudinal length within a range of about 250 inches (635 cm) to about 350 inches (889 cm). For example, the air table 400 may have a longitudinal length of about 288 inches (731.5 cm). In some embodiments, the air table 400 may have a lateral width within a range of about 50 inches (127 cm) to about 150 inches (381 cm). For example, the air table 400 may have a lateral width of about 96 inches (243.8 cm). As a non-limiting example, the air table 400 may accommodate articles at least a size of a California King size mattress topper. However, although specific dimensions are provided in the present disclosure, one of ordinary skill in the art would readily recognize that a size of the air table 400 could be adjusted to accommodate different sizes of articles that may be made with the air table 400.

The top surface of the top panel 410 of the top structure 402 may be located between about 34 inches (86.4 cm) and about 42 inches (106.7 cm) from a ground surface when the air table 400 is assembled. A top surface (e.g., working surface) at this height may provide a comfortable working surface for seated operators of the air table 400. In other words, the height of the top surface may reduce fatigue a user may experience when using the air table 400.

When the air table 400 is operating, the at least one air supply 406 may blow air into the top structure 402 of the air table 400 and the air may escape (e.g., be blown) through the plurality of vents 408. The air blown out of the plurality of vents 408 may provide a lift for lifting articles placed on the air table 400, the lift provided by a thin sheet of flowing air between the article placed on the air table 400 and the top surface of the air table 400.

In some embodiments, the air table 400 may be mountable to a ground surface with fasteners coupled with the plurality of legs 404 of the air table 400. Mounting the air table 400 to a ground surface may provide additional stability and predictability when operating the air table 400.

Figure 5:
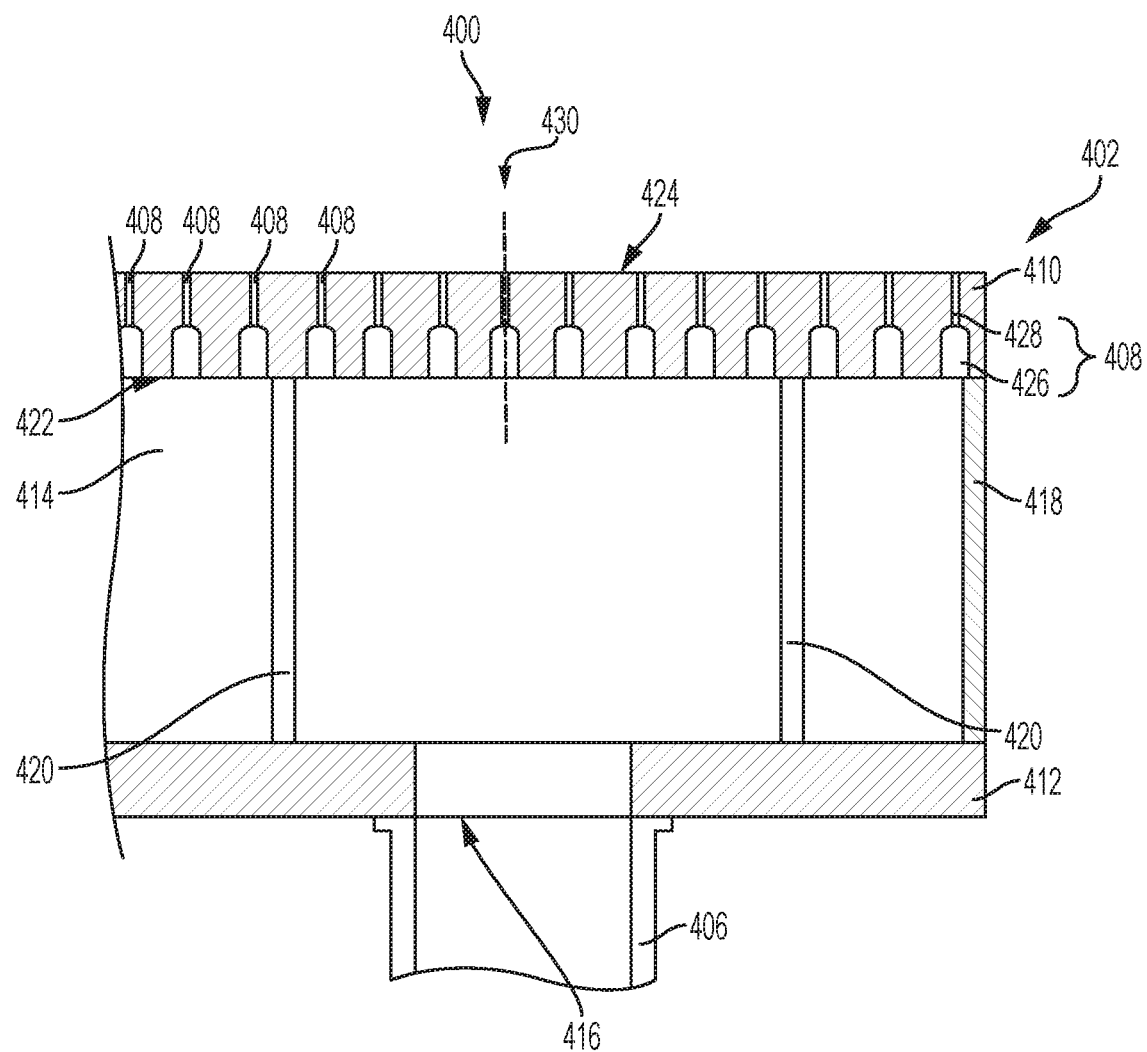
FIG. 5 is a simplified partial cross-sectional side view of the air table of FIG. 4.

FIG. 5 is a partial cross-sectional side view of the top structure 402 of the air table 400 of FIG. 4. The top structure 402 may include the top panel 410, the bottom panel 412, an air chamber 414, the plurality of vents 408, at least one air intake hole 416, a sidewall 418, and at least one support member 420. The top panel 410 may be oriented above the bottom panel 412 and may at least partially define the air chamber 414 between the top panel 410 and the bottom panel 412. The sidewall 418 may extend along outer peripheral edges of the top panel 410 and bottom panel 412 and may extend between the top panel 410 and the bottom panel 412. The sidewall 418 may also at least partially define the air chamber 414.

The plurality of vents 408 may extend through the top panel 410 of the top structure 402. For example, the plurality of vents 408 may extend from a bottom surface 422 of the top panel 410 to the top surface 424 of the top panel 410. Each vent 408 of the plurality of vents 408 may include a large section 426 and a small section 428. The large section 426 of a respective vent 408 may have a larger diameter than a diameter of the small section 428 of the respective vent 408. The large section 426 may extend from the bottom surface 422 of the top panel 410 (i.e., surface facing the air chamber 414) and may extend partially through the top panel 410 but may not extend completely through the top panel 410. For example, the large section 426 of a respective vent 408 may extend halfway or over halfway through the top panel 410. The small section 428 may extend from the large section 426 of the vent 408 and may extend through a remainder of the top panel 410 and through a top surface 424 of the top panel 410.

The large sections 426 of the plurality of vents 408 may have diameters within a range of about 0.125 inch (0.318 cm) to about 1.50 inches (3.81 cm). For example, in some embodiments, the large sections 426 may have diameters of about 0.50 inch (1.27 cm). The small sections 428 of the plurality of vents 408 may have diameters within a range of about 0.02 inch (0.05 cm) to about 0.25 inch (0.635 cm). For example, in some embodiments, the small sections 428 may have diameters of about 0.0625 inch (0.16 cm).

The large sections 426 of the plurality of vents 408 may have longitudinal lengths within a range of about 0.02 inch (0.05 cm) to about 3.0 inches (7.6 cm). For example, the large sections 426 of the plurality of vents 408 may have longitudinal lengths of about 1.0 inch (2.54 cm). The small sections 428 of the plurality of vents 408 may have longitudinal lengths within a range of about 0.02 inch (0.05 cm) to about 3.0 inches (7.6 cm).

The large sections 426 and the small sections 428 of the plurality of vents 408 may enable a velocity (e.g., speed) of the air traveling through the plurality of vents 408 to be increased. For example, the air traveling through the plurality of vents 408 may experience a Venturi effect, which is known in the art, where a velocity of a fluid flows through a constricted section (i.e., small sections 428 of the plurality of vents 408) of a pathway increase. Increasing a velocity of the air traveling through the plurality of vents 408 may provide increased lift near the top surface 424 of the top panel 410 of the air table 400. For example, when wanting to provide lift to an object, increasing air velocity is often more effective than increasing a pressure of the air. Thus, by increasing a velocity of the air traveling through the plurality of vents 408 of the air table 400, the lift provided by the air (i.e., force placed against an object disposed on the top surface 424 of the top panel 410 of the air table 400 by the air) is increased. In some embodiments, the diameters of the large sections 426 and the small sections 428 may be selected to provide a certain amount of lift (e.g., force) for a selected amount of air flow.

Having the small sections 428 of the plurality of vents 408 extend through only a portion of the top panel 410 (e.g., reducing a length of the small sections 428) instead of the completely through the top panel 410 (i.e., by including the large sections 426), may reduce a resistance that air experiences when traveling through the plurality of vents 408. As a result, a flow rate of the air may be less affected by the resistance, which reduces a load on the at least one air supply 406 to maintain a selected flow rate, which saves on costs and makes the air table 400 more efficient.

In some embodiments, a longitudinal axis 430 of each vent 408 of the plurality of vents 408 may be orthogonal to the top surface 424 of the top panel 410 of the top structure 402. In other embodiments, an acute angle may be defined between the longitudinal axis 430 of each vent 408 of the plurality of vents 408 and the top surface 424 of the top panel 410 of the top structure 402.

The top and bottom panels 410, 412 may have thicknesses within a range of about 0.02 inch (0.05 cm) to about 3.0 inches (7.6 cm). For example, the top and bottom panels 410, 412 may thicknesses of about 0.75 inch (1.91 cm). In some embodiments, the top and bottom panels 410, 412 may include one or more of a medium-density fiberboard ("MDF") material, particle board, plywood, wood, or a polymer material.

In some embodiments, the at least one air intake hole 416 may extend through the bottom panel 412 of the top structure 402 of the air table 400. In other embodiments, the at least one air intake hole 416 may extend through a sidewall 418 or the top panel 410 of the air table 400. In some embodiments, the at least one air intake hole 416 may be generally centered between lateral and longitudinal sides of the air table 400. In some embodiments, the air table 400 may include two or more air intake holes 416, and the two or more air intake holes 416 may be generally evenly spaced apart to give at least generally consistent airflow throughout the air chamber 414 of the air table 400. The at least one air supply 406 may be aligned with (e.g., connected to the air table 400 at) the at least one air intake hole 416 and may provide air to the air chamber 414 of the air table 400 through the at least one air intake hole 416.

The at least one support member 420, if any, may be disposed in the air chamber 414 of the air table 400, may extend between the top panel 410 and the bottom panel 412, and may support the top panel 410. In some embodiments, the at least one support member 420 may include at least one post made of a structural material such as, for example, metal, wood, or plastic. In some embodiments, the at least one support member 420 may include two or more support members 420, and the two or more support members 420 may be at least substantially evenly distributed (e.g., spaced apart from one another) within the air chamber 414 of the air table 400 and between the top panel 410 and the bottom panel 412. However, the air table 400 may not include too many support members 420. In other words, the air table 400 may not include a number of support members 420 that would detrimentally reduce airflow to the plurality of vents 408 of any portion of the air table 400.

Figure 6:
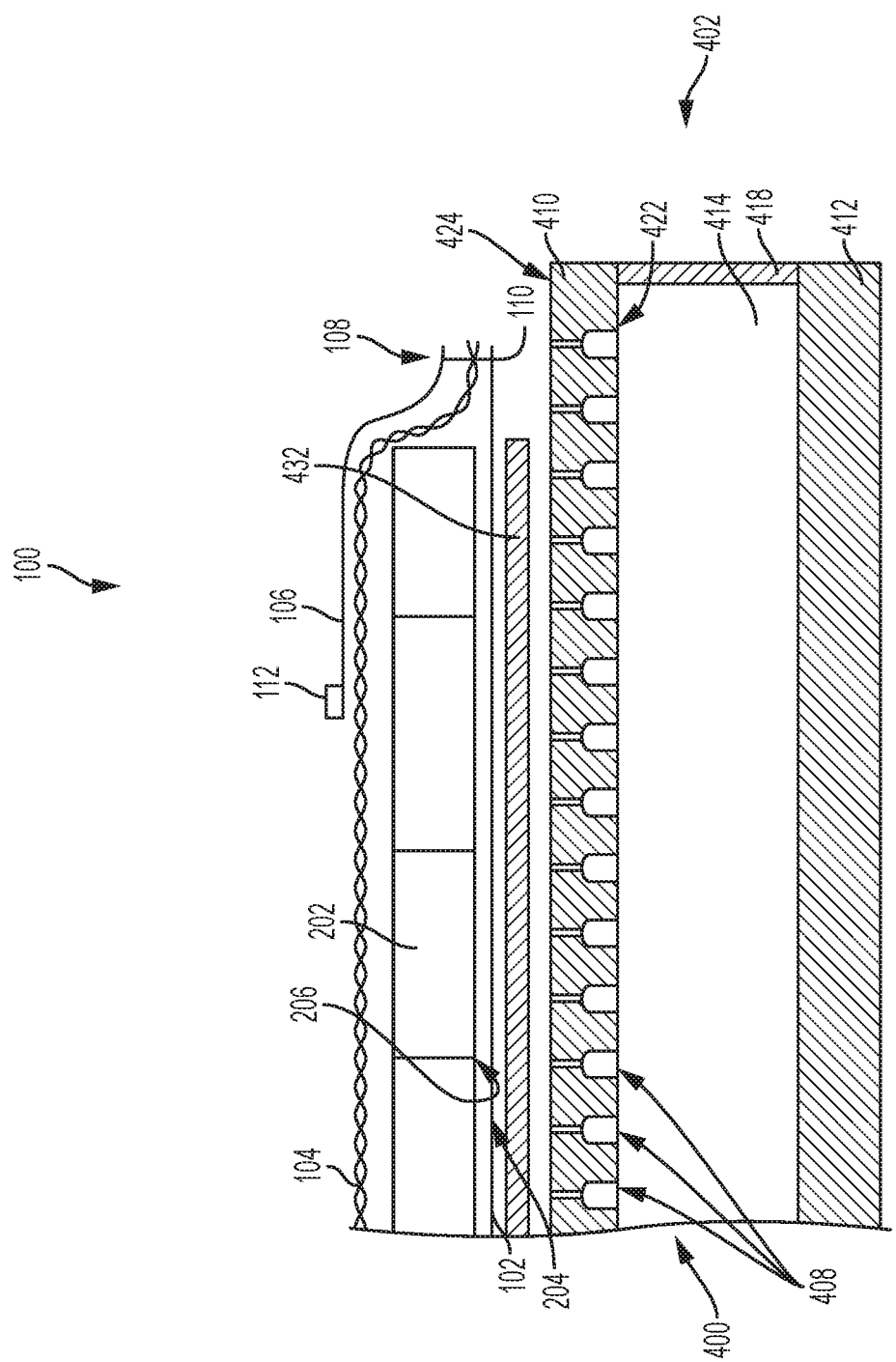
FIG. 6 is a simplified and schematically illustrated partial cross-sectional side view of an air table having a mattress topper disposed thereon according to an embodiment of the present disclosure.

FIG. 6 is a partial cross-sectional side view of the air table 400 of FIG. 5 having the mattress topper 100 of FIG. 3 disposed thereon. Some elements of FIG. 6 may be exaggerated and/or simplified to better show elements of the air table 400 and the mattress topper 100 and for clarity. As discussed above, the air table 400 may provide lift under the mattress topper 100 to help an operator maneuver the mattress topper 100 while sewing the mattress topper 100 (e.g., sewing the seam 108).

In some embodiments, the mattress topper 100 may be at least substantially permeable and would likely not be lifted by the air table 400 if placed in direct contact with the air table 400. Thus, to provide lift to the mattress topper 100, a substrate panel 432 may be placed between the mattress topper 100 and the air table 400. The substrate panel 432 may be at least substantially "airtight" (e.g., may not let a significant amount of air pass therethrough). For example, the substrate panel 432 may include a panel of a polymer material, cardboard, STYROFOAM®, metal, fabric, or any other airtight or low-air permeable material.

During use, air blown through the plurality of vents 408 of the air table 400 may push against the substrate panel 432 and may exert a force on the substrate panel 432. The force exerted on the substrate panel 432 may cause the substrate panel 432 to lift up (e.g., hover, float, etc.) relative to the top surface 424 of the top panel 410 of the air table 400 such that at least some air is between the substrate panel 432 and the top surface 424 of the top panel 410 of the air table 400. By lifting the substrate panel 432, the air table 400 may also lift a mattress topper 100 that is placed on the substrate panel 432.

In some embodiments, the substrate panel 432 may be smaller in size than a mattress topper 100 when viewed from a plane defined by the top surface 424 of the air table 400 (e.g., a plane that is perpendicular to the plane defined by FIG. 6). In other words, the substrate panel 432 may not extend past or to the peripheral edge of the mattress topper 100 when the mattress topper 100 is disposed on the substrate panel 432. The smaller size of the substrate panel 432 may allow portions of the mattress topper 100 to brush against (e.g., touch) the air table 400 when the substrate panel 432 and mattress topper 100 are lifted by the air table 400. In other words, portions of the mattress topper 100 may hang over an outer peripheral edge of the substrate panel 432 and may drop onto the air table 400. Having portions of the mattress topper 100 touch the air table 400 may help to reduce and/or prevent unintentional movement of the mattress topper 100. For example, having portions of the mattress topper 100 touch the air table 400 may prevent the mattress topper 100 from moving unintentionally while being lifted by the air table 400.

Reducing and/or preventing unintentional movement of the mattress topper 100 may provide greater control of the mattress topper 100 when maneuvering the mattress topper 100 on the air table 400. Greater control of the mattress topper 100 when maneuvering the mattress topper 100 may lead to fewer mistakes while making the mattress topper 100 and may increase safety for an operator when sewing the mattress topper 100.

Moreover, the smaller size of the substrate panel 432 may help to keep at least some distance between the substrate panel 432 and the seam 108 of the mattress topper 100. The distance between the substrate panel 432 and the seam 108 of the mattress topper 100 may keep the substrate panel 432 from interfering with the seam 108 of the mattress topper 100 when an operator is sewing the seam 108. For example, while the mattress topper 100 is lifted by the air table 400, an operator may sew the seam 108 of the mattress topper 100.

In some embodiments, multiple substrate panels 432 may be used instead of a single substrate panel 432. For example, when sewing a relatively large article, such as a king sized mattress topper 100, multiple substrate panels 432 may be used to lift different portions of the king sized mattress topper 100.

Referring to FIGS. 5 and 6 together, depending on the size of an article being sewn, an amount of lift (e.g., a force being applied to the substrate panel 432 by the air being blown through the plurality of vents 408) may be adjusted by adjusting how much air is being blown into the air chamber 414 of the air table 400 by the at least one air supply 406. For example, when sewing a relatively heavy article, such as a mattress topper 100 comprising a gel layer, an amount of lift may be increased, and when sewing a relatively light article, such as a mattress topper 100 comprising a foam layer (and not a gel layer), an amount of lift may be decreased.

Figure 7:
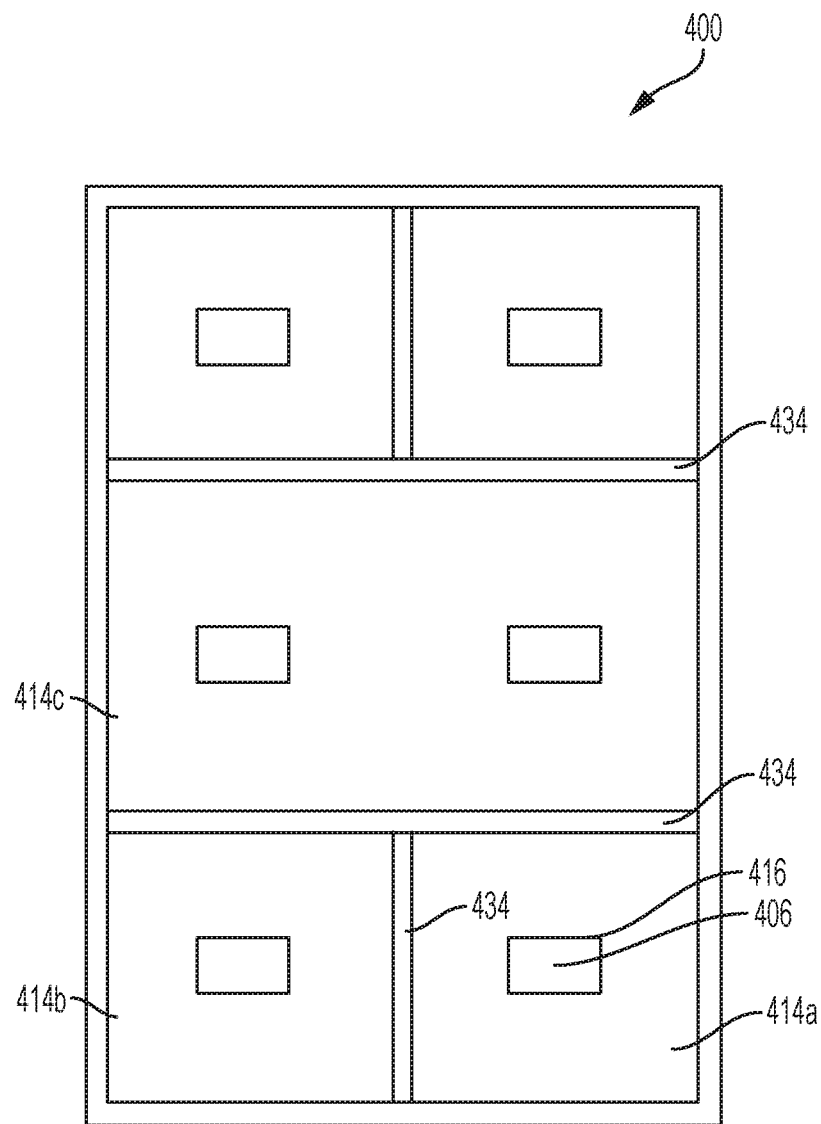
FIG. 7 is a simplified top view of an air table for making mattress toppers according to another embodiment of the present disclosure.

FIG. 7 is a top view of an air table 400 having a top panel 410 removed to better show internal elements of the air table 400. In some embodiments, the air table 400 may include one or more divider members 434. The divider members 434 may be disposed within the air chamber 414 (FIG. 5) of the air table 400 and may divide the air chamber 414 into two or more air chamber portions 414a, 414b, 414c, etc. For example, the divider members 434 may divide the air chamber 414 into a first air chamber 414a portion and a second air chamber 414b portion. In such embodiments, each air chamber portion 414a, 416b may include a respected air intake hole 416 and an air supply 406.

By dividing the air chamber 414 into two or more air chamber portions 414a, 414b, 414c, an operator may select which portions of the air table 400 the operator wishes to activate (e.g., turn on) when making an article. By being able to select which portions of an air table 400 the user wants to use, it may allow the user to use only portions of the air table 400 necessary for making the article. As a result, less energy (e.g., electricity) may be required when making smaller articles, which may lead to cost savings and increased efficiencies.

Furthermore, by dividing the air chamber 414 into two or more air chamber portions 414a, 414b, 414c, an operator may customize amounts of lift provided at different portions of the air table 400. For example, some portions of the air table 400 may be set to provide more lift than other portions of the air table 400.

Figure 8:
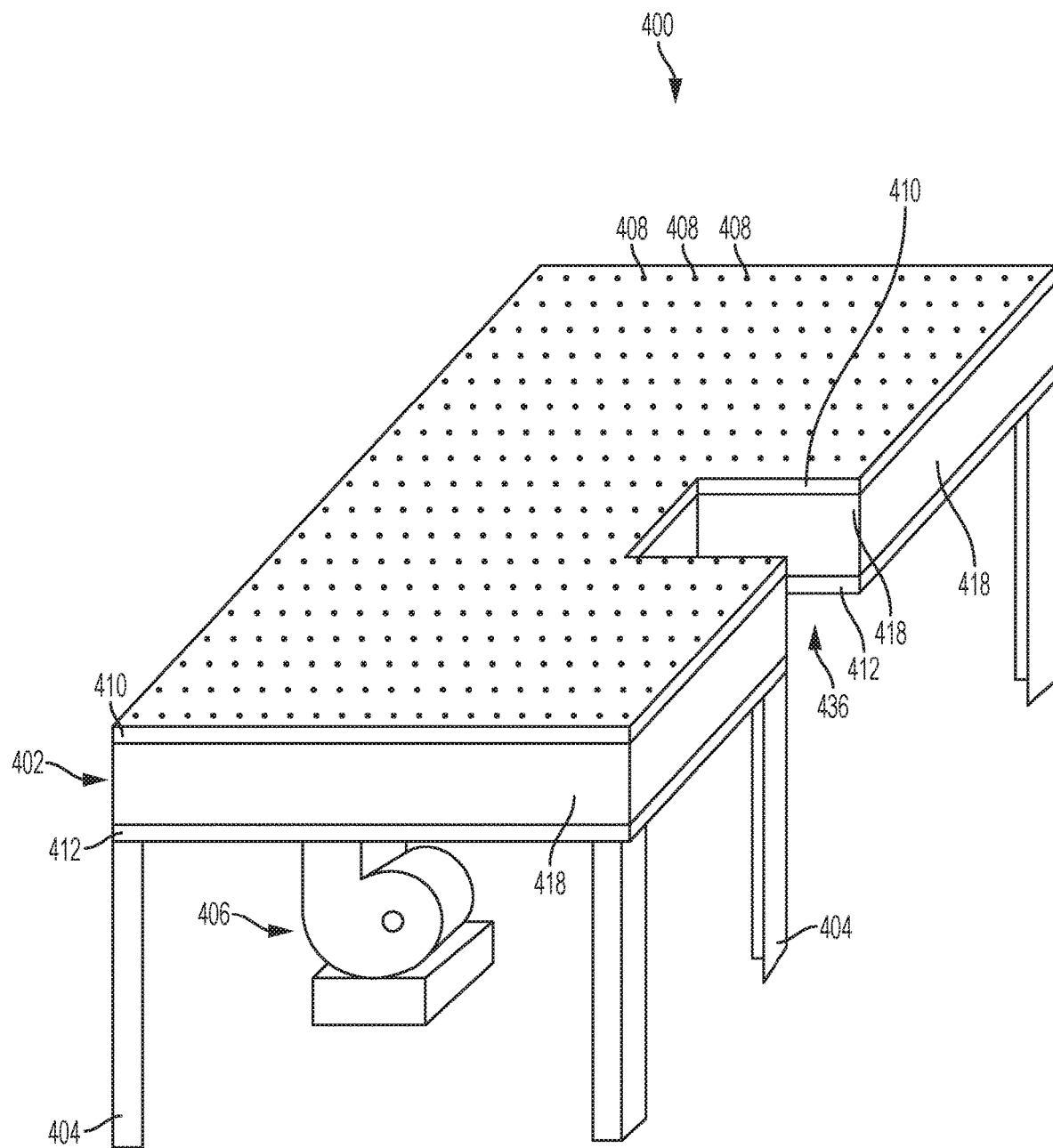
FIG. 8 is a simplified perspective view of an air table for making mattress toppers according to another embodiment of the present disclosure.
Figure 9:
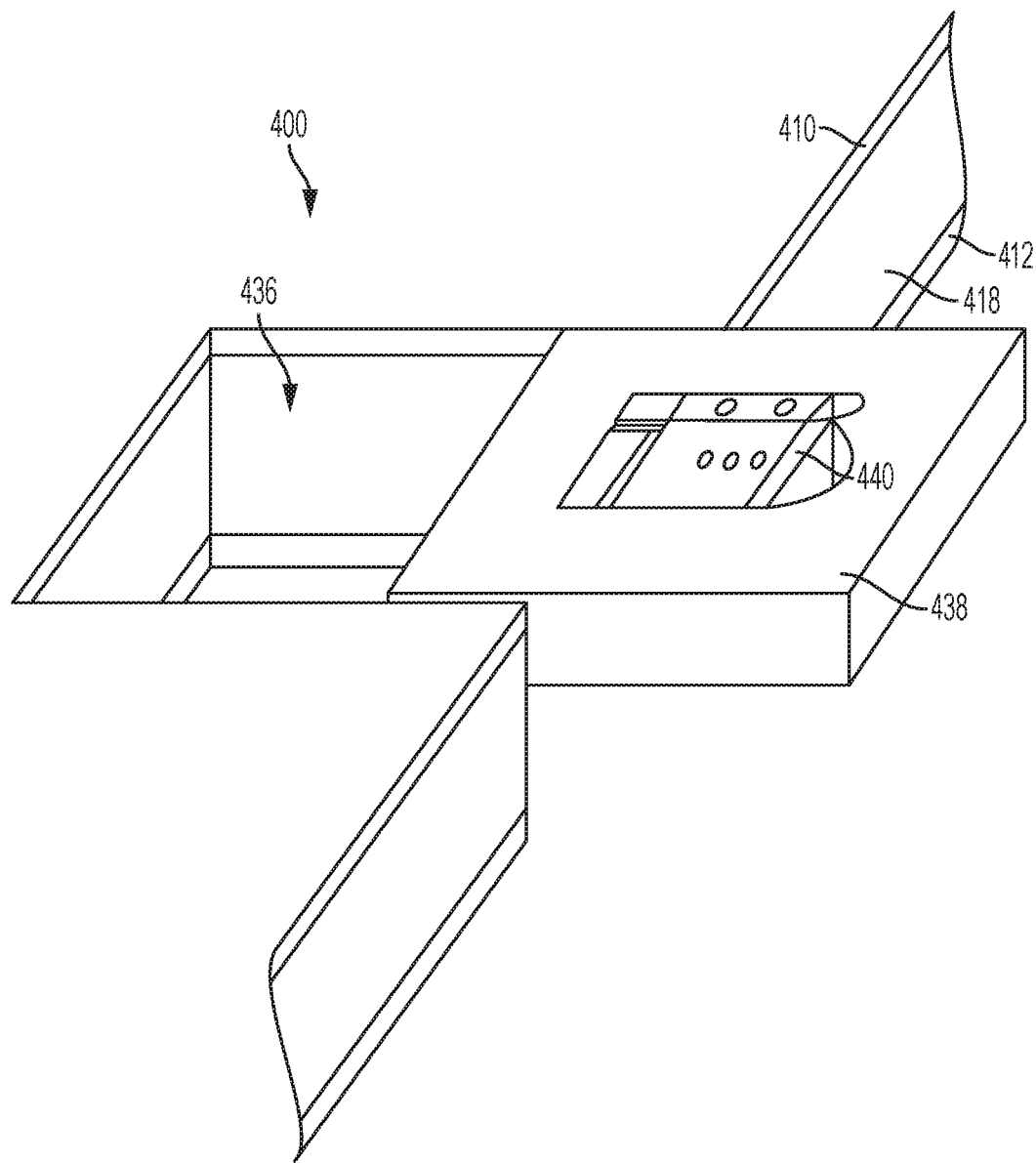
FIG. 9 is a simplified perspective view of an insertable portion of the air table having a sewing machine for sewing with the air table of FIG. 8 according to an embodiment of the present disclosure.

FIG. 8 is a perspective view of an air table 400 according to another embodiment of the present disclosure. In some embodiments, the air table 400 may include a cutout portion 436 extending from a side of the air table 400 and toward a center of the air table 400. FIG. 9 is a partial perspective view of the air table 400 of FIG. 8 and an insertable portion 438 having a sewing machine 440 attached thereto. Referring to FIGS. 8 and 9 together, the insertable portion 438 may be sized and shaped to fit within the cutout portion 436 of the air table 400.

The cutout portion 436 of the air table 400 may enable a sewing machine 440 to be disposed within a boundary defined by an outer peripheral edge of the air table 400. Having the sewing machine 440 disposed within the boundary of the air table 400, may allow the sewing machine 440 to perform sewing procedures on an article (e.g., sewing the seam 108 on a mattress topper 100) without having the article extend beyond the boundary of the air table 400 (i.e., not being supported and/or lifted by the air table 400).

Moreover, the cutout portion 436 may allow sewing machines 440 and respective insertable portions 438 used in conjunction with the air table 400 to be readily and quickly exchanged. As a result, sewing machines 440 for performing different sewing procedures (e.g., different sewing stitches) may be readily exchanged at a given air table 400 so that different sewing procedures can be performed on an article without moving that article from air table 400 to air table 400.

Figure 10:
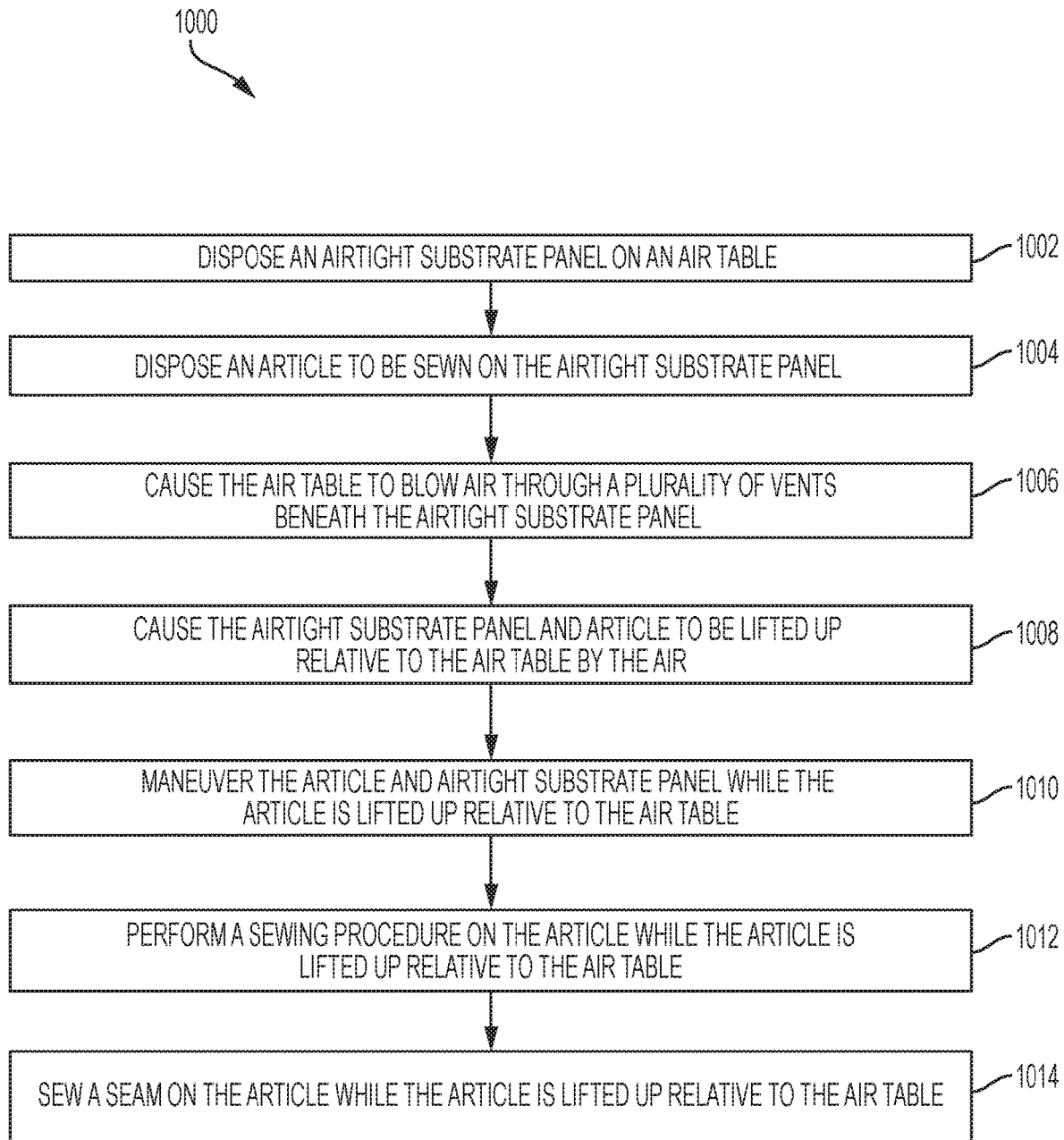
FIG. 10 is a flowchart of a process for making a mattress topper with an air table according to an embodiment of the present disclosure.

FIG. 10 shows a flowchart of a process 1000 of sewing an article on an air table 400. Referring to FIGS. 3-6 and 10 together, the process may include disposing an at least substantially airtight or a low-air-permeable substrate panel 432 on an air table 400, as represented in act 1002. The substrate panel 432 may include one or more of a polymer material, cardboard, STYROFOAM®, metal, fabric, or any other airtight or low-air-permeable material. An article to be sewn may be disposed upon the substrate panel 432 such that the substrate panel 432 is disposed between the article and the substrate panel 432, as represented in act 1004. In some embodiments, the article may include a mattress topper 100 such as the mattress toppers 100 described in regard to FIGS. 1-3.

An operator may cause the air table 400 to blow (e.g., expel) air through a plurality of vents 408 extending through a top surface 424 of air table 400 underneath the substrate panel 432, as represented in act 1006. The air blown through the plurality of vents 408 may exert a force on the substrate panel 432 and/or article to be sewn. The substrate panel 432 and/or article may be caused to be lifted relative to (e.g., to float above) the air table 400 by the air blowing through the plurality of vents 408, as represented in act 1008. An operator may maneuver the article relative to the air table 400 while the article is lifted relative to the air table 400, as represented in act 1010. An operator may perform sewing procedures on the article while the article is lifted relative to the air table 400, as represented in act 1012. In some embodiments, the sewing procedures may include sewing a seam 108 along a peripheral edge of the article (e.g., mattress topper 100), as represented in act 1014.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An air table configured and operable for precise positioning making a mattress topper, comprising:
    a top panel comprising a plurality of vents extending from a bottom surface of the top panel to a top surface of the top panel that defines an exterior of the air table, each vent of the plurality of vents having a longitudinal axis that is orthogonal to the top surface of the top panel and opening to the exterior of the air table;
    a bottom panel disposed beneath the top panel, wherein a top surface of the bottom panel is at least substantially parallel to the top surface of the top panel;
    at least one sidewall extending along peripheral edges of the top panel and bottom panel and extending between the top panel and the bottom panel;
    an air chamber defined between the top panel and the bottom panel and by the at least one sidewall;
    at least one air intake hole extending from an exterior of the air table to the air chamber of the air table; and
    at least one air supply connected to the at least one air intake hole, the at least one air supply configured to blow air into the air chamber of the air table through the at least one air intake hole and to blow air out of the air chamber of the air table through the plurality of vents of the top panel.

2. The air table of claim 1, wherein the at least one air intake hole of the air table comprises a plurality of air intake holes and the at least one air supply comprises a plurality of air supplies.

3. The air table of claim 1, wherein the air table further comprises at least one divider member extending between the top panel and the bottom panel and dividing the air chamber into a first air chamber portion and a second air chamber portion.

4. The air table of claim 1, wherein each vent of the plurality of vents of the air table comprises:
    a large section extending from the bottom surface of the top panel and partially through the top panel; and
    a small section extending from the large section and to the top surface of the top panel, a diameter of the large section being larger than a diameter of the small section.

5. The air table of claim 4, wherein the diameter of the large section is within a range of about 0.125 inch (0.318 cm) to about 1.5 inches (3.81 cm) and wherein the diameter of the small section is within a range of about 0.02 inch (0.05 cm) to about 0.25 inch (0.635 cm).

6. The air table of claim 5, wherein the vents of the plurality of vents are oriented in a grid pattern.

7. The air table of claim 4, wherein the large section of each vent of the plurality of vents has a longitudinal length with a range of about 0.02 inch (0.05 cm) to about 3.0 inches (7.6 cm), and wherein the small section of each vent of the plurality of vents has a longitudinal length with a range of about 0.02 inch (0.05 cm) to about 3.0 inches (7.6 cm).

8. The air table of claim 5, wherein the vents of the plurality of vents of the air table are oriented in a grid pattern.

* * * * *